United States Patent [19]
Ooshio et al.

[11] Patent Number: 5,253,675
[45] Date of Patent: Oct. 19, 1993

[54] APPARATUS FOR CONNECTING DOUBLE VACUUM PIPES FOR CONDUCTING CRYOGENIC FLUID

[75] Inventors: Takeaki Ooshio; Reichi Makishima, both of Tokyo, Japan

[73] Assignee: Nitto Kohki Co., Ltd., Tokyo, Japan

[21] Appl. No.: 845,258

[22] Filed: Mar. 3, 1992

[30] Foreign Application Priority Data

Mar. 22, 1991 [JP] Japan ............................. 3-024558[U]

[51] Int. Cl.$^5$ ............................................. F16L 37/28
[52] U.S. Cl. .............................. 137/614.05; 62/50.7; 285/47
[58] Field of Search ............. 137/614, 614.02, 614.04, 137/614.05, 614.06; 62/50.7; 285/47

[56] References Cited

U.S. PATENT DOCUMENTS

| | | | |
|---|---|---|---|
| 4,011,732 | 3/1977 | Doherty et al. | 285/47 X |
| 4,805,417 | 2/1989 | Weaver et al. | 137/614 X |
| 5,014,743 | 5/1991 | Makishima | 137/614.05 X |

FOREIGN PATENT DOCUMENTS

| | | |
|---|---|---|
| 56-63178 | 5/1981 | Japan . |
| 60-85690 | 6/1985 | Japan . |
| 1-41879 | 9/1989 | Japan . |

*Primary Examiner*—Martin P. Schwadron
*Assistant Examiner*—Kevin L. Lee
*Attorney, Agent, or Firm*—Nixon & Vanderhye

[57] ABSTRACT

An apparatus for connecting two double vacuum pipes for conducting cryogenic fluid consists of a tubular connecting mechanism connected to the outer tube of a double vacuum pipe by a tubular member, a one-touch locking mechanism connected to the outer tube of the other double vacuum pipe by another tubular member inserted in the first-mentioned tubular member, a warming chamber defined between both tubular members, valve mechanisms respectively provided between the tubular members and the inner tubes of the double vacuum pipes which valve mechanisms cooperate to close the inner tubes of the respective double vacuum pipes at the closed position so as to make the inner tube of one of the double vacuum pipes communicate with the warming chamber during the connection of both the double vacuum pipes and to cause the inner tubes of both double vacuum pipes to communicate with each other. During the connection of both double vacuum pipes, cryogenic liquid is introduced in the warming chamber to be evaporated and its temperature is raised to avoid generation of frost on the to-be-connected portions of the double vacuum pipes. A one-touch locking mechanism provides quick connection and disconnection of the double vacuum pipes.

16 Claims, 5 Drawing Sheets

APPARATUS FOR CONNECTING DOUBLE VACUUM PIPES FOR CONDUCTING CRYOGENIC FLUID

BACKGROUND OF THE INVENTION

1. Field of the Invention

This invention relates to an apparatus for connecting double vacuum pipes for conducting cryogenic fluids such as liquid helium or liquid nitrogen.

2. Description of the Related Art

Recently, the demand for liquid helium, which has a very low boiling point of $-269°$ C. has increased in the field of superconducting techniques. Double pipes having a large adiabatic effect or a large heat-insulating effect are used as pipes for supplying cryogenic fluid such as liquid helium from a large tank to a small tank. If an ordinary quick pipe coupler for connecting single pipes is used, the connecting portions of the coupler are cooled to a very low temperature and frost attaches thereto as the cryogenic fluid comes to contact with the inner peripheral surfaces of the coupler during the connecting process. Thus, this ordinary pipe coupler cannot hermetically connect the double vacuum pipes together. In overcoming this difficulty, a connecting apparatus employing a flange coupler and defrost means is usually been used, as disclosed in Japanese Patent Examined Application Publication 1-41879, Japanese Patent Unexamined Application Publication 56-63178 and Japanese Utility Model Unexamined Application Publication 60-85690.

The connecting apparatus employing a flange coupler can attain a satisfactory sealing effect but has the disadvantage that it takes too long to connect pipes. Further, if no defrost means is used, the attachment of frost to the coupler cannot be avoided. Moisture in the air is condensed by the cryogenic fluid and attaches as frost to the flange coupler of the connecting apparatus, making it difficult to connect the pipes. The frost on the flange portion is removed by blowing hot wind onto the flange portion or by gasifying the cryogenic fluid at room temperature until it reaches the flange coupler. The latter method, as disclosed in Japanese Patent Examined Application Publication 1-41879, is performed by a connector which comprises longer double vacuum pipes for evaporation connected end-to-end to each other and an outer pipe having a larger diameter than the double vacuum pipes and surrounding them. The cryogenic fluid is introduced in an annular space defined between the outer tube and the double vacuum pipes and become warm until it gasifies. Thus, the outer peripheral surface of the outer pipe is made contact with the outer atmosphere. Since this apparatus also contains a flange coupler, the double vacuum pipes can be neither rapidly connected to nor rapidly disengaged from each other.

SUMMARY OF THE INVENTION

The object of this invention is to provide a connecting apparatus for connecting double vacuum pipes for conducting cryogenic fluid which can limit, to a very small amount, the leakage of cryogenic liquid occurring during the connection process of the double vacuum pipes and which facilitates the connection of the double vacuum pipes in a short time.

In order to attain this object, an apparatus for connecting first and second double vacuum pipes for conducting cryogenic fluid is proposed, each of the double vacuum pipes comprising an inner tube defining therein a fluid passage and having two ends and an outer tube having an inner peripheral surface an inner space and two ends, the apparatus comprising: a connecting member having two ends; a first tubular member having an outer peripheral surface an inner space and two ends, one end being connected to one of said two ends of the connecting member in said inner space of said outer tube of said first double vacuum pipe, the first tubular member being inserted in the outer tube of the first double vacuum pipe, with a space being defined between said inner peripheral surface of said outer tube of said first double vacuum pipe and said outer peripheral surface of said first tubular member, a first valve mechanism hermetically connecting the other end of the first tubular member to one of the two ends of the inner tube of the first double vacuum pipe, the first valve mechanism having a first valve movable axially of the first tubular member, for closing the inner tube of the first double vacuum pipe when the first valve is not moved toward said one end of said inner tube of said first double vacuum pipe and for causing the inner tube of the first vacuum pipe to communicate with the inner space of the first tubular member when the first valve is moved toward the other end of the inner tube of the first double vacuum pipe; a one-touch locking mechanism having two ends, one end being connected to one of the two ends of the outer tube of the second double vacuum pipe, and having the connecting member inserted thereinto from the other end of the locking mechanism, the locking mechanism having a locking position at which the locking mechanism securely holds the connecting member; a second tubular member having two ends, one end being connected to the other end of the locking mechanism, the second tubular member extending from the locking mechanism in a direction opposite to said one end of the locking mechanism, the second tubular member being inserted in the first tubular member, with a space being defined between said first and second tubular members; a warming chamber defined between the first and second tubular members;

a second valve mechanism for hermetically connecting the other end of the second tubular member to one of the two ends of the inner tube of the second double vacuum pipe, the second valve mechanisms having a second valve engageable with the first valve and movable axially of the second tubular member, for closing the inner tube of the first double vacuum pipe when the second valve means is not moved toward said one end of said inner tube of said second double vacuum pipe and for causing the inner tube of the second vacuum pipe to communicate with the inner space of the first tubular member when the second valve is moved toward said the other end of the inner tube of the second double vacuum pipe so as to cause the inner space of the first tubular member to communicate with the warming chamber; and a communication space defined between said first and second valve means, for effecting communication between the inner tubes of the first and second double vacuum pipes when the locking means securely holds the connecting means.

BRIEF DESCRIPTION OF THE DRAWINGS

This invention will be described in detail by way of a preferred embodiment with reference to the accompanying drawings, in which.

DETAILED DESCRIPTION OF THE PREFERRED EMBODIMENT

Figure 1:
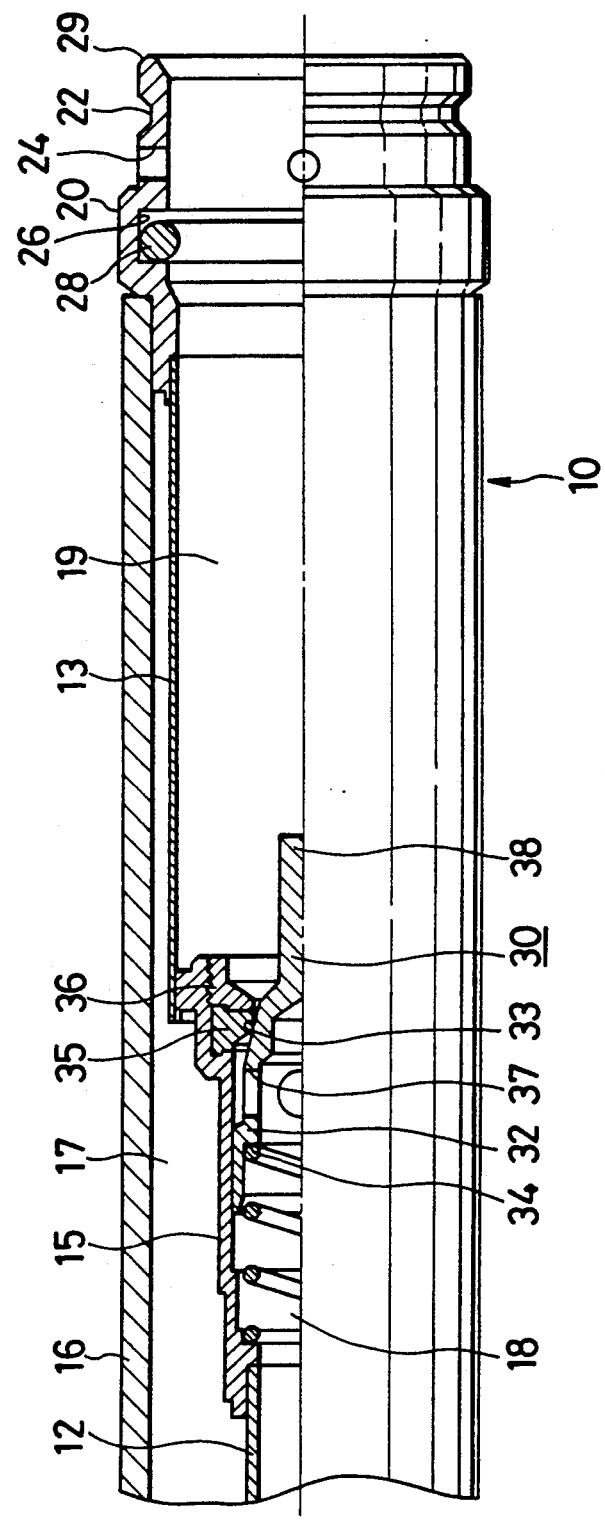
FIG. 1 is a side view of the connecting unit of the connecting apparatus for connecting double vacuum pipes for conducting cryogenic fluid according to one embodiment of this invention, with the upper half thereof longitudinally cross-sectioned.
Figure 2:
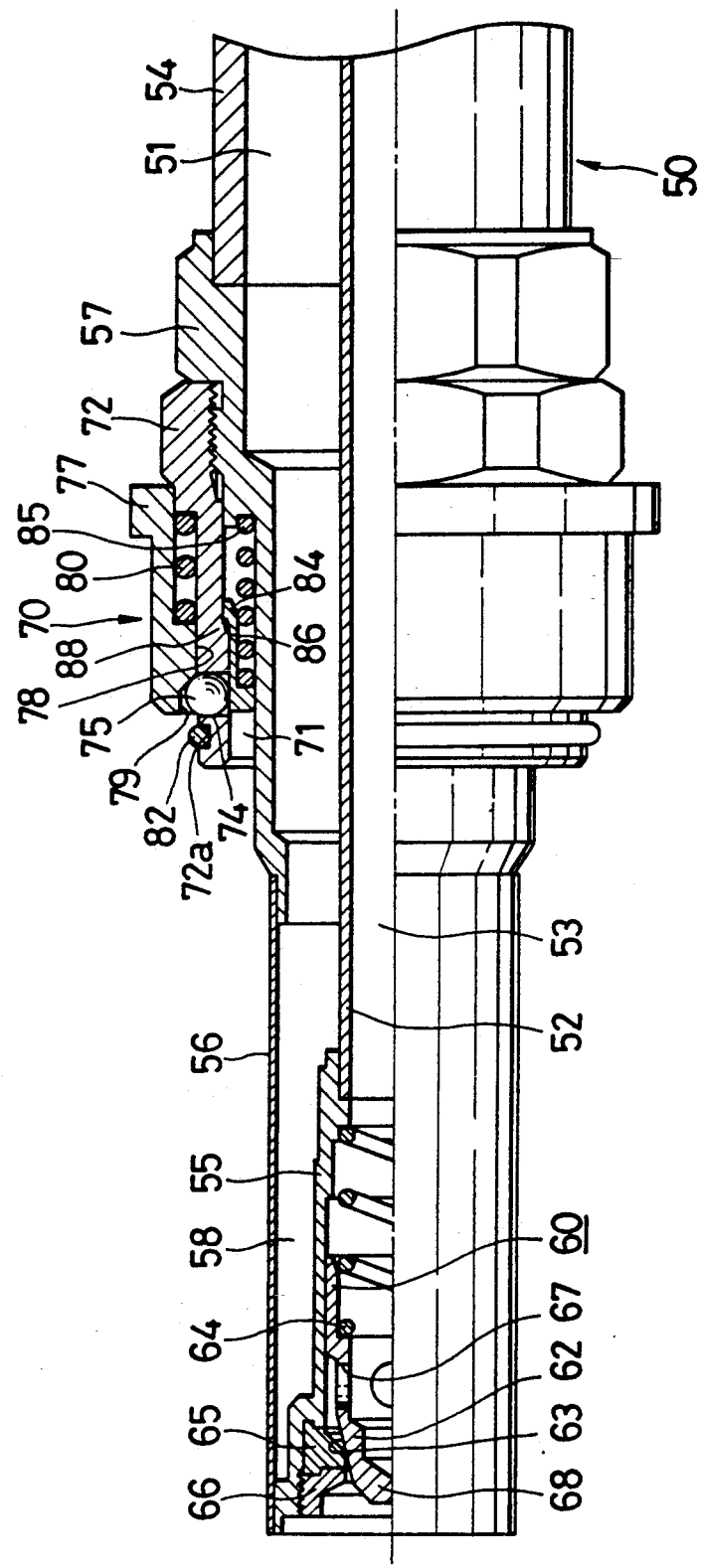
FIG. 2 is a side view of the locking unit of the connecting apparatus according to the embodiment, with the upper half thereof longitudinally cross-sectioned.

An apparatus for connecting double vacuum pipes for conducting cryogenic fluid comprises a connecting unit to which a helium supplying pipe 10 is connected and a locking unit to which a helium supplied pipe 50 is connected, as individually shown in FIGS. 1 and 2. For simplicity, the ends and end portions of both pipes 10 and 50 which are to be connected together are referred to as the "forward ends" and "forward end portions" and the ends and end portions thereof which are to be connected to large and small helium tanks are referred to as the "rear ends" and "rear end portions", respectively.

As shown in FIG. 1, the helium supplying pipe 10 to be connected to the helium supplied pipe 50 comprises an inner tube 12 and an outer tube 16, which is longer than the inner tube 12, so as to assume a double pipe structure. A tubular member 13 having a larger diameter than the inner tube 12 but a smaller diameter than the outer tube 16 has one end fixed airtight to the forward end of the inner tube 12 by means of a tubular closing member 15 so as to extend from the forward end of the inner tube 12. The forward end portion of the outer tube 16 and the other end portion of the tubular member 13 are fixed airtight to the rear end portion of a connecting ring 20.

An adiabatic vacuum space (a heat-insulating vacuum space or a vacuum inner space) 17 is defined between the outer peripheral surfaces of the inner tube 12 and the tubular member 13 and the inner peripheral surface of the outer tube 16. A common fluid passage or an inner space 18 is formed in the inner tube 12, the closing member 15 and the tubular member 13. The inner space of the tubular member 13 is also used as an insertion passage 19 in which a tubular member 52, described hereinafter and fixed to the forward end portion of the helium supplied pipe 50 is inserted. An outer annular groove 22 for receiving locking balls 75, described later, is formed in the outer peripheral wall of the front end portion of a connecting ring 20. Four through holes 24 (any other number of holes being possible) are formed circumferentially equidistant in a portion of the connecting ring 20 just behind the annular groove 22.

An inner annular groove 26 is formed in the inner peripheral wall of the central portion of the connecting ring 20. An O-ring 28 is fitted in the annular groove 26. Since the O-ring 28 is not over-cooled, it can be made of ordinary rubber.

A hollow valve 30 comprises hollow cylindrical main valve body 32 and a rod-shaped valve head 38 connected to a conical valve portion 33 formed on the forward end portion of the main valve body 32. The valve 30 has a substantially Y-shaped longitudinal cross section such that the conical valve portion 33 forms both the arms of a letter Y and the valve head forms the leg of the letter Y. The main valve body 32 is slidably fitted into the closing member 15 and is urged forward by means of a valve spring (a compression coil spring) 34. A ring-shaped valve seat 35 is fitted in the forward end portion of the tubular closing member 15. A seat holder 36 is provided to fix the valve seat 35 to the inner peripheral surface of the closing member 15 so that they are in close contact with each other, as shown in FIG. 1. In the state shown in FIG. 1, the valve 30 is in a closed position. Communication holes or through holes 37 are circumferentially arranged in the portion of the valve 30 between the main valve body 32 and the outer peripheral surface of the conical portion 33 of the main valve body 33.

Referring to FIG. 2, the helium supplied pipe 50 also has a double structure comprising an inner tube 52 and an outer tube 54, which is shorter than the inner tube 52. Hermetically fixed to the forward end of the outer tube 54 is the rear end of a tubular extension 57. To the forward end of the tubular extension 57 is also airtight fixed a tubular member 56 having the same length as, and a diameter slightly smaller than, the tubular member 13 of the helium supplying pipe 10. The forward ends of the inner tube 52 and the tubular member 56 are airtight connected together by means of a tubular closing member 55 disposed in the tubular member 56. An adiabatic vacuum space (a heat-insulating vacuum space or a vacuum inner space) 51 is defined between the outer peripheral surfaces of the inner tube 52 and the closing member 55, and the inner peripheral surfaces of the outer tube 54 and the tubular member 56. A fluid passage or an inner space 53 is formed in the inner tube 52 and the closing member 55.

A hollow valve 60 having a substantially U-shaped longitudinal cross section is fitted in the closing member 55 and is urged forward by means of a valve spring (a compression coil spring) 64 having a spring constant larger than the valve spring 34 in the helium supplying pipe 10. The valve 60 is provided with a cup-shaped valve head 68 having a U-shaped longitudinal cross section and having a conical main body 62 with an outer peripheral surface 63. Communication holes or through holes 67 are circumferentially arranged in an intermediate peripheral wall section of the valve 60. A ring-shaped valve seat 65 is mounted on the inner peripheral surface of the closing member 55 so as to closely contact it. A seat holder 66 is fixedly placed in front of the closing member 55 and fixes the valve seat 65 to the inner peripheral surface of the closing member 55. In the state shown in FIG. 2, the valve 60 is in a closed position. Both the valve seats 35 and 65 can be removed from the respective closing members 15 and 55 by taking out the seat holders 36 and 65 therefrom, and can also be replaced.

A one-touch locking unit or mechanism 70 is provided for securely holding the outer tube 54. A ball holding ring 72 is threadably engaged with the outer peripheral surface of that intermediate portion of the tubular extension 57 extending from the forward end of the outer tube 54 which has an intermediate diameter such that an annular space 71 opened at its forward end is defined between the outer peripheral surface of the extension 54a and the inner peripheral surface of the ball holding ring 72. Rollable locking balls 75 are loosely fitted in a plurality of tapered holes 74 radially formed in the forward portion of the ring 72 in such a manner that the balls 75 are radially movable in and away from the holes 74. A ball fixing ring 77 is axially slidably mounted on the ball holding ring 72 and is urged forward by means of a compression coil spring 80 provided between both rings 72 and 77. The ball holding ring 77 has a ball holding surface 78 which is the inner peripheral surface of the ring 77 and a ball receiving recessed portion 79 formed in the forward end of the ring 77. An annular stop member 82 is fitted in an annular groove 72a formed in the outer peripheral surface of the forward end portion of the ring 72 such that the stop member 82 prevents the balls 75 from slipping off the recessed portion 79.

A ball supporting ring 84 inserted in the annular space 71 is always urged forward by means of a compression coil spring 85 disposed between the ring 84 and the extension 57. A flanged portion 86 is formed on the rear end of the ring 84 and engages a shoulder 88 formed on the inner peripheral surface of the intermediate part of the forward end portion of the ball supporting ring 72 such that the ring 84 does not slip off the supporting ring 72. The balls 75 are urged inward in the through holes 74 by the wall of the recessed portion 79 and ride on the outer peripheral surface of the forward end portion of the ball supporting ring 84. Thus, the balls 75 are held in the through holes 74 in a state in which the balls 75 are received by the recessed portion 79 when the helium supplied pipe 50 is not connected to the helium supplying pipe 10 as shown in FIG. 2.

In operation, the rear end of the helium supplying pipe 10 is connected to a large tank (not shown) storing cryogenic liquid helium and the rear end of the helium supplied pipe 50 is connected to a small tank (not shown) to which the liquid helium is supplied through the connecting apparatus. The spaces 17 and 51 defined between the inner tubes 12 and 52 and the outer tubes 16 and 54 of the helium supplying pipe 10 and the helium supplied pipe 50 are evacuated at a high degree and form cryogenic adiabatic or cryogenic heat-insulating spaces. Since the fluid passages 18 and 53 are respectively closed by the hollow valves 30 and 60, liquid helium does not escape even if the helium supplied pipe 50 is disconnected from the helium supplying pipe 10.

Figure 3:
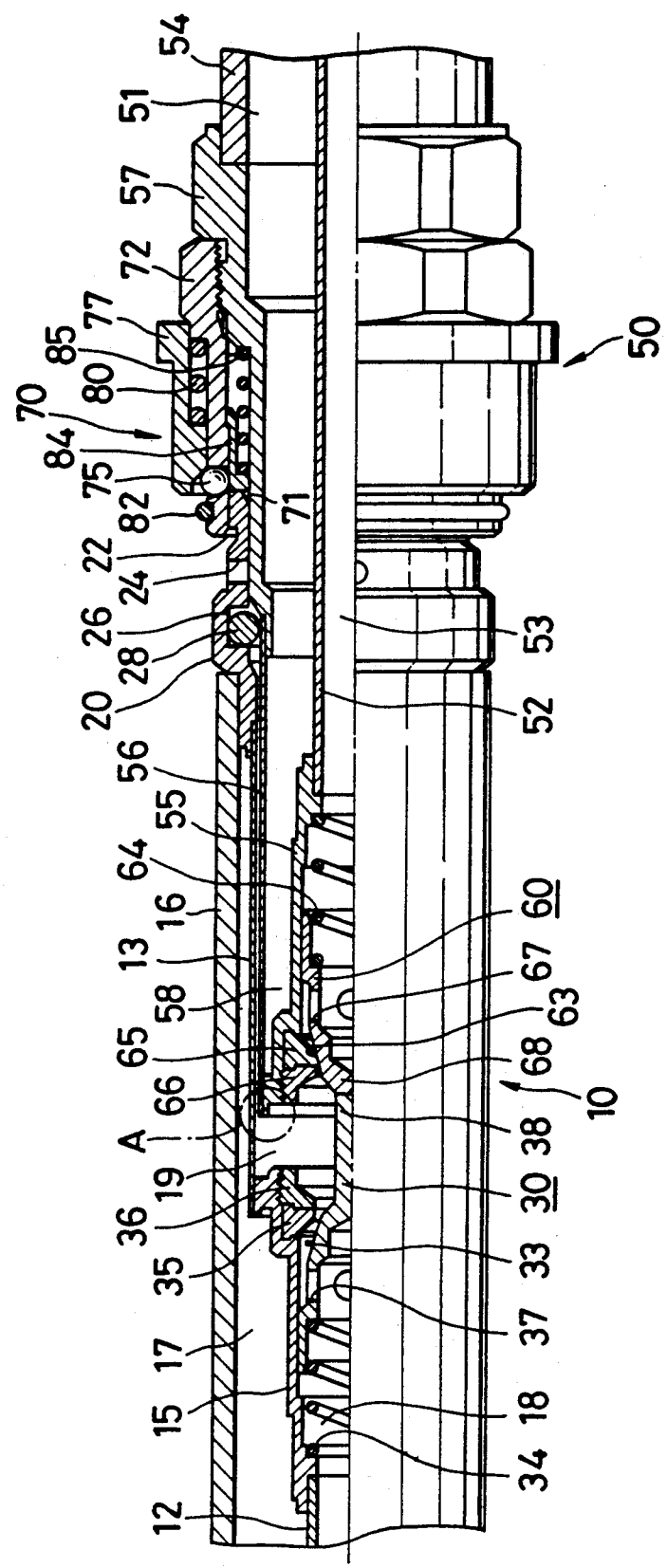
FIG. 3 is a side view of the connecting apparatus, with the upper half thereof longitudinally cross-sectioned when the connecting unit is being connected to the locking unit.

In the process of connecting the helium supplied pipe 50 to the helium supplying pipe 10 as shown in FIG. 3, the tubular member 56 extending from the extension 57 of the outer tube 54 of the helium supplied pipe 50 is inserted in the passage 19, that is, in the tubular member 13 extending from the inner tube 12 of the helium supplying pipe 10, and the forward portion of the connecting ring 20 of the helium supplying pipe 10 is inserted in the annular space 71 of the helium supplied pipe 50 such that a very narrow annular gap or a narrow annular warming chamber 40 is formed between the inner peripheral surface of the tubular member 13 and the outer peripheral surface of the tubular member 56.

Figure 4:
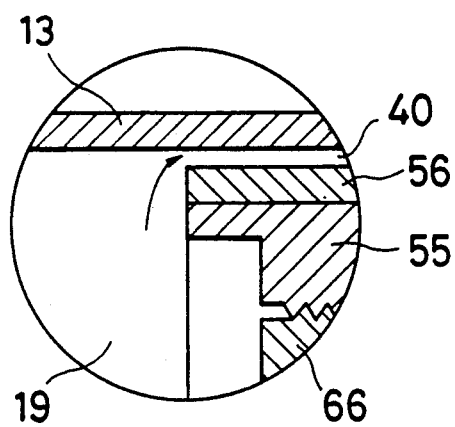
FIG. 4 is an enlarged view of portion A in FIG. 3.

The forward ends of the valve heads 38 and 68 of the valves 30 and 60 abut against each other and the valve 30 at the side of the helium supplying pipe 10 retracts against the urging force of the valve spring 34, as the connecting ring 20 is inserted in the ball holding ring 72. That portion of the passage 18 which is disposed in the helium supplying pipe 10 communicates with the rear end portion of the insertion passage (inner space) 19 via the communication holes 37. Thus, liquid helium flows into the passage 19 through the holes 37. In this state, the valve 60 at the side of the helium supplied pipe 50 is still closed because the spring 64 has a larger spring constant than the spring 34, and the liquid helium begins to flow into the narrow annular warming chamber 40 toward the locking ball 75, as shown in FIG. 4 in a large scale. The connecting ring 20 is exposed to the outer atmosphere through the hole 24 and is maintained at room temperature. When, therefore, a small amount of the liquid helium flows into the warming chamber 40 adjacent to the connecting ring 20, it is heated till it gradually gasifies and its temperature rises from cryogenic temperature to a high temperature close to the temperature of the outer atmosphere, i.e., room temperature, whereupon the gaseous helium above the cryogenic temperature flows out through the through holes 24 formed in the connecting ring 20 to the outer atmosphere without frost attaching to the elements of the connecting apparatus such as the locking balls 75 and the ball holding ring 72. In this way, residual air in the insertion passage 19 is replaced with gaseous helium when the helium supplied tube 50 is connected to the helium supplying pipe 10.

Further, the annular member 56 extends from the forward end of the tubular extension 57 to the region of the outer peripheral surface of the valve seat 65 such that a long cylindrical vacuum space 58 is formed between the valve seat 65 and the closing member 55. The long vacuum space 58 prevents frost from becoming attached to the locking mechanism 70. Thus, the tubular extension 57 is easily detached from the ball holding ring 72 without being influenced by frost.

Figure 5:
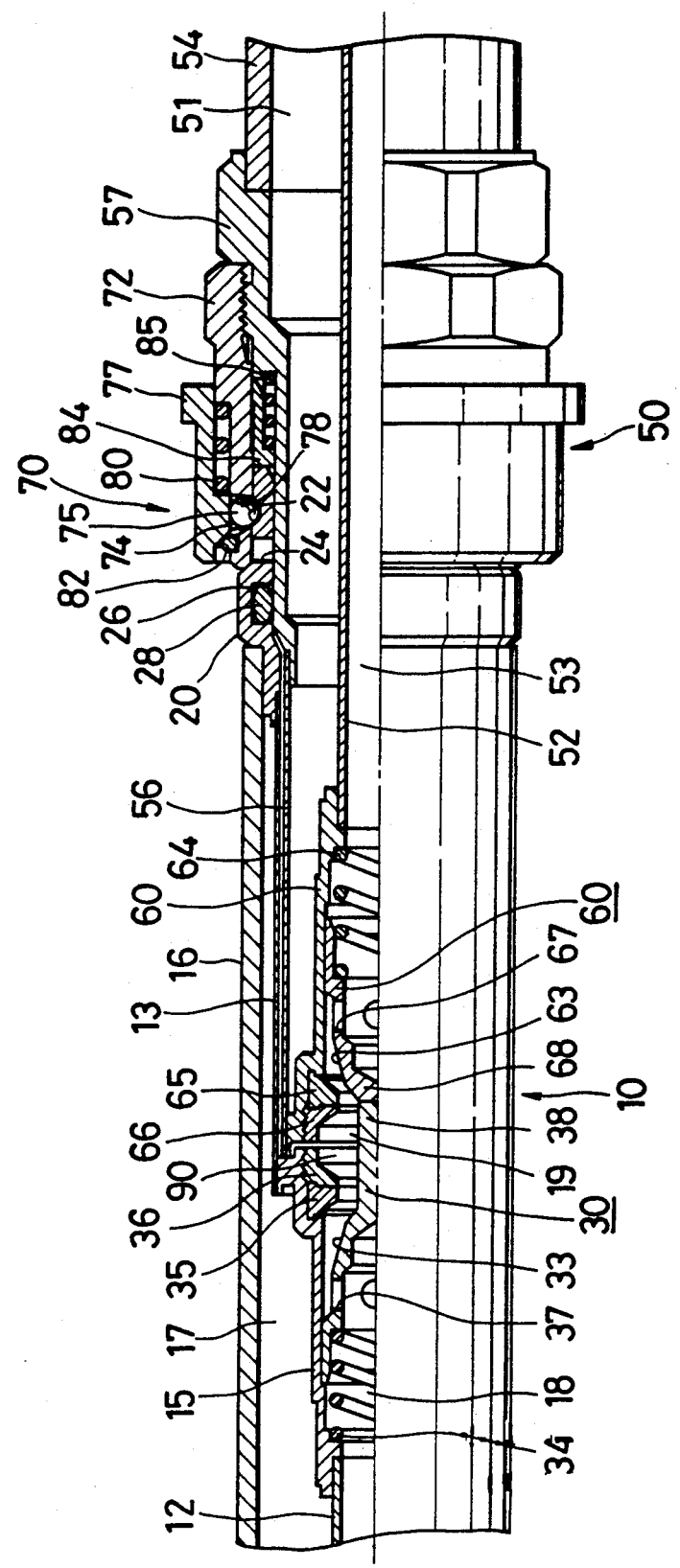
FIG. 5 is a side view of the connecting apparatus, with the upper half thereof longitudinally cross-sectioned when the connecting unit is fully connected to the locking unit.

Since both the tubular members 13 and 56 are respectively placed in the adiabatic vacuum spaces 17 and 51, this arrangement also avoids the generation of frost. This enables the tubular member 56 to be further inserted in the insertion passage 19. As the connecting ring 20 is pushed into the annular space 77 as shown in FIG. 5, the forward end portion 29 of the connecting ring 20 abuts against the forward end portion of the ball supporting ring 84, and the ring 84 retracts against the urging force of the compression coil spring 85. The locking balls 75 are separated from the outer peripheral surface of the ring 84 and then slide rearward on the outer peripheral surface of the connecting ring 20. Finally, the tapered holes 74 are radially aligned with the annular groove 22 of the connecting ring 20 and the locking balls 75 are received thereby. The ball fixing ring 77 is moved forward by the urging force of the compression spring 80, then the locking balls 75 are released from the ball receiving recessed portion 79 and engage the inner peripheral surface of the ball fixing ring 77. The inner peripheral surface of the ball fixing ring 77 pushes the locking balls 75 radially inward to lock the connecting ring 20 to the locking unit 70 such that the locking unit 70 is in a locking position as shown in FIG. 5. As a result, the helium supplied pipe 50 is completely connected to the helium supplying pipe 10 without being influenced by cryogenic liquid helium. The O-ring 28 effects sealing between the outer peripheral surface of the extension 54a of the outer tube 54 of the helium supplied pipe 50 and the inner peripheral surface of the connecting ring 20, and the stop 82 prevents the ball fixing ring 77 from slipping off the ball holding ring 72. The valve 60 at the side of the helium supplied pipe 50 is pushed by the valve 30 at the side of the helium supplying pipe 10 and is retracted against the urging force of the valve spring 64, the valves then taking their open positions, as shown in FIG. 5. At the open positions of the valves 30 and 60, a closed communication chamber 90 is formed between the valve seats 35 and 65 and the valves 30 and 60. The communication chamber 90 communicates with the fluid passages 18 and 53 in the inner tubes 12 and 52 through the holes 37 and 67. In other words, the fluid passage 18 communicates with the fluid passage 53. As a result, liquid helium is supplied from the large tank to the small tank through the passages 18 and 53, the chamber 90 and the holes 37 and 67.

When the helium supplied pipe 50 is disconnected from the helium supplying pipe 10 after the supply of liquid helium has been completed, the ball holding 72 is manually retracted against the urging force of the compression coil spring 80. Then, the locking balls 75 are released from the inner peripheral surface of the ring 77 and received in the recessed portion 79 of the ring 77. In this way, the locking balls 75 are smoothly disengaged from the annular groove 22 without being influenced by the temperature of the cryogenic liquid helium, whereby both the pipes 10 and 50 are separated from each other by pulling them in axially opposite directions. After the helium supplied tube 50 has been disconnected from the helium supplying tube 30, the valves 30 and 60 close the fluid passages 18 and 53, respectively. The apparatus according to this invention can be used for transporting cryogenic fluids other than liquid helium, such as liquid nitrogen.

What is claimed is:

1. An apparatus for connecting first and second double vacuum pipes for conducting cryogenic fluid, each of said first and second double vacuum pipes comprising an inner tube defining therein a fluid passage and having two ends, and an outer tube having an inner peripheral surface, an inner space and two ends, said apparatus comprising:

connecting means having two ends;
   a first tubular member having an outer peripheral surface, an inner space and two ends, one end being connected to one of said two ends of said connecting means in said inner space of said outer tube of said first double vacuum pipe, said first tubular member being inserted in said outer tube of said first double vacuum pipe, with a space being defined between said inner peripheral surface of said outer tube of said first double vacuum pipe and said outer peripheral surface of said first tubular member;
   first valve means for hermetically connecting the other end of said first tubular member to one of said two ends of said inner tube of said first double vacuum pipe, said first valve means having a first valve movable axially of said first tubular member, for closing said inner tube of said first double vacuum pipe when said first valve is not moved toward said one end of said inner tube of said first double vacuum pipe and for causing said inner tube of said first double vacuum pipe to communicate with said inner space of said first tubular member when said first valve is moved toward said one end of said inner tube of said first double vacuum pipe;
   one-touch locking means having two ends, one end being connected to one of said two ends of said outer tube of said second double vacuum pipe, and having said connecting means inserted therein from the other end of said locking means, said locking means having a locking position at which said locking means securely holds said connecting means;
   a second tubular member having two ends, one end being connected to said other end of said locking means, said second tubular member extending from said locking means in a direction opposite to said one end of said locking means, said second tubular member being inserted in said first tubular member, with a space being defined between said first and second tubular members;
   a warming chamber defined between said first and second tubular members;
   second valve means hermetically connecting the other end of said second tubular member to one of said two ends of said inner tube of said second double vacuum pipe, said second valve means having a second valve engageable with said first valve and movable axially of said second tubular member together with said first valve, for closing said inner tube of said second double vacuum pipe when said second valve means is not moved toward said one end of said inner tube of said second double vacuum pipe and for causing said inner tube of said second double vacuum pipe to communicate with said warming chamber when said second valve is moved toward said one end of said inner tube of said second double vacuum pipe; and
   a communication space defined between said first and second valve means, for effecting communication between said inner tubes of said first and second double vacuum pipes when said locking means securely holds said connecting means.

2. The apparatus according to claim 1, wherein said first valve means has a first closing member having two ends, one end being hermetically connected to said other end of said first tubular member and the other end being hermetically connected to said one end of said inner tube of said first double vacuum tube, and first urging means for urging said first valve toward said one end of said first closing member to close said first valve; and wherein said second valve means has a second closing member having two ends, one end being hermetically connected to said other end of said second tubular member and the other end being hermetically connected to said one end of said inner tube of said second double vacuum tube and second urging means for urging said second valve toward said one end of said second closing member to close said second valve.

3. The apparatus according to claim 2, wherein each of said first and second urging means comprises a compression coil spring.

4. The apparatus according to claim 2, wherein said first valve has at least one through hole for causing said inner tube of said first double vacuum pipe to communicate with said inner space of said first tubular member, and said first valve has a closed position at which said through hole of said first valve is closed and an open position at which said through hole of said first valve is opened; and wherein said second valve has at least one through hole for causing said inner tube of said second double vacuum tube to communicate with said inner space of first tubular member, and said second valve has a closed position at which said through hole of said second valve is closed and an open position at which said through hole of said second valve is opened when said locking means securely holds said connecting means so as to cause said inner tube of said first double vacuum pipe to communicate with said inner tube of said second double vacuum pipe through said communication space.

5. The apparatus according to claim 4, wherein said second urging means has a larger spring constant than said first urging means such that said second valve is immovable until said locking means securely holds said connecting means.

6. The apparatus according to claim 4, wherein said first valve has a first head and said second valve has a second head abutting against said first head.

7. The apparatus according to claim 6, wherein said first valve comprises a main body having an outer peripheral surface inclined inwardly toward said second valve and said first head, which has a rod shape and extends from said main body toward said second valve, and said second valve comprises said second head, which has a cup shape and abuts against said first head.

8. The apparatus according to claim 7, wherein each of said first and second valve means has a valve seat provided in each of said first and second closing members and contacting each of said main body of said first valve and said second head of said second valve when each of said first and second valves is at said closed position.

9. The apparatus according to claim 8, wherein said first and second valves and said valve seats are detachably mounted in said first and second closing members.

10. The apparatus according to claim 8, wherein each of said first and second closing members has a seat holder for holding each of said valve seats.

11. The apparatus according to claim 8, wherein said second ring member extends to said valve seat of said second annular member.

12. The apparatus according to claim 1, wherein said connecting means comprises a connection ring.

13. The apparatus according to claim 1, wherein said one-touch locking means has a locking position and comprises ball locking means.

14. The apparatus according to claim 13, wherein said locking means comprises:
(a) a ball holding ring having through holes arranged circumferentially, an inner peripheral surface and two ends, one end being tightly connected to said one end of said outer tube of said first double vacuum pipe;
(b) balls slidably fitted in said through holes in said ball holding ring;
(c) a ball fixing ring axially slidably mounted on said ball holding ring and having a ball releasing recessed portion located so as to face said balls and cause said balls to abut thereagainst when said double vacuum pipes have not yet been completely connected together;
(d) urging means for urging said ball fixing ring toward said one end of said ball holding ring;
(e) a ball supporting ring fitted in said ball holding ring in a region of said balls and having an outer peripheral surface for supporting said balls when said first and second double vacuum pipes have not yet been completely connected together; and
(f) said connecting means comprises a tubular connecting ring having two ends, one end being connected to said one end of said first double vacuum pipe and slidably inserted in said ball holding ring from the other end of said connecting ring, said connecting ring having an outer peripheral surface in which an annular groove is formed for receiving said balls at a locked position in a state in which said balls contact said inner peripheral surface of said ball fixing ring.

15. The apparatus according to claim 11, wherein said locking means has another urging means for urging said ball supporting ring toward said first tubular member.

16. The apparatus according to claim 12, wherein each of said urging means and said another urging means comprises a compression coil spring.

* * * * *